United States Patent [19]

Davis et al.

[11] 4,043,974
[45] Aug. 23, 1977

[54] PROCESS FOR STABILIZING POLYAMIDES

[75] Inventors: John Maxwell Davis, Signal Mountain, Tenn.; Sigred Boyd Lanoux, Lafayette, La.

[73] Assignee: E. I. Du Pont de Nemours and Company, Wilmington, Del.

[21] Appl. No.: 630,425

[22] Filed: Nov. 10, 1975

Related U.S. Application Data

[63] Continuation-in-part of Ser. No. 546,593, May 2, 1966, abandoned.

[51] Int. Cl.$^2$ .............................................. C08K 5/53
[52] U.S. Cl. ................... 260/45.75 C; 8/171; 260/45.7 P; 260/45.7 R
[58] Field of Search ............... 260/45.75 C, 45.7 P, 260/45.7 R; 8/171

[56] References Cited

U.S. PATENT DOCUMENTS

| | | | |
|---|---|---|---|
| 2,705,227 | 3/1955 | Stamatoff | 260/45.7 P |
| 3,944,518 | 3/1976 | Burrows et al. | 260/45.75 C |

*Primary Examiner*—V. P. Hoke

[57] ABSTRACT

An improved process for the preparation of synthetic polycarbonamide filaments, having high strength along with good dyeability and good resistance to heat and light degradation, results from addition of a hexamethylene diammonium phenylphosphonate salt to a polycarbonamide-forming composition containing a soluble copper salt and a metal halide.

8 Claims, No Drawings

PROCESS FOR STABILIZING POLYAMIDES

CROSS-REFERENCE TO RELATED APPLICATION

This application is a continuation-in-part of copending application Ser. No. 546,593 filed May 2, 1966 now abandoned.

BACKGROUND OF THE INVENTION

1. Field of the Invention

This invention concerns an improved process for the preparation of strong, dyeable, heat resistant filaments of synthetic polycarbonamides from polycarbonamide-forming compositions containing a soluble copper salt, a metal halide and a phosphorus compound.

2. Description of the Prior Art

Shaped articles such as fibers, yarn, filaments, staple, pellicles, molded forms and the like produced from a polyamide are well know. Such materials are commercially known as nylon. Preparation of polymers suitable for use in manufacturing such shaped articles may be prepared according to the processes described in U.S. Pat. Nos. 2,071,250; 2,071,253; and 2,130,948. In order to attain various improvements for certain specific applications, numerous modifications of the basic processes have been suggested. For example, Stamatoff U.S. Pat. No. 2,705,227 teaches that resistance to oxidative degradation can be enhanced by inclusion of a combination of: (1) a dissolved copper compound, (2) a halogen compound, and (3) a phosphorous acid compound. Anton U.S. Pat. No. 3,377,314 teaches the use of hexamethylene diammonium phenylphosphinate in combination with cupric acetate and potassium iodide for polyamide yarns having for instance high strength, whiteness, high dye-absorbability, resistance to thermal degradation and good processability.

Molten polyamide compositions of Anton have a tendency to lose copper during processing by the formation of polymer-insoluble copper compounds or metallic copper. Particles of these deposits in time cause problems for continuous, commercial, polymerization and spinning processes, particularly at higher phosphinate concentrations in the polymer. The resulting lower copper content also provides less protection in the filaments.

SUMMARY OF THE INVENTION

It is an object of this invention to provide a synthetic polycarbonamide filament of high-strength, stabilized against the action of both heat and light and having improved acid-type dye absorbability.

Another object is to provide a process for the production of a stabilized, acid dyeable, polycarbonamide filament which may be processed in a continuous manner without rapid plugging of the spinneret or polymer filtering medium.

The invention is in a process for the preparation of a heat-stabilized polycarbonamide filament having enhanced acid-dyeability including preparing the polymer by melt-polymerization in the presence of a soluble copper compound, a metal halide and a phosphorus compound and melt-spinning a filament from the polymer, the improvement for reducing the loss of soluble copper from the molten polymer comprising adding as the phosphorus compound at least 0.01% based on the weight of the polymer of hexamethylene diammonium phenylphosphonate to the polymer precursors before or during polymerization.

The phosphonate compound is preferably added to the polymer precursors before polymerization but it may be added during polymerization. It should be present in a dissolved state as polymerization proceeds. The other additives are present preferably during polymerization to assist in even distribution throughout the polymer without the need of subsequent polymer mixing.

Use of the diammonium salt prepared by the addition of hexamethylene diamine to a aqueous solution of phenylphosphonic acid in sufficient quantity to adjust the pH of the solution to 6.2 is particularly desirable in the process of the invention. The hexamethylene diammonium phenylphosphonate may be formed separately and added to the salt solution or the reaction mixture or it may be formed in situ. Hexamethylene diammonium phenylphosphonate precipitates from aqueous solution when its concentration exceeds 15% by weight of the solution. It has a melting point of 230° C. and thermally decomposes rapidly at about 300° C.

The addition of 0.01% of phosphonate compound is observed to improve the receptivity to acid dyes to some extent. However, it is preferred that at least 0.05% based on the weight of polymer be added and it is generally desirable to add at least about 0.5%. Amounts up to the limit of solubility of the particular phosphonate in a particular polyamide is sometimes advantageous.

The addition of soluble copper compound and halide such as potassium iodide all are described in U.S. Pat No. 2,705,227. From about 0.001% to 0.03% by weight of copper compound and up to 5% by weight of potassium iodide may be added to the polymer.

EXAMPLE I

This example illustrates the process of the invention and the improved dyeability of the polymeric composition of the invention as compared to a similar composition wherein a dye-assist is excluded.

A polymerization technique similar to that of Example I of U.S. Pat No. 2,163,636 is followed. A 25 gallon stainless steel autoclave, equipped with a helical ribbon agitator, was purged of air and charged with aqueous solutions of the following ingredients:

TABLE I

| Ingredient | Dry Wt. (Lbs.) |
| --- | --- |
| Hexamethylene diammonium adipate | 52.2 |
| Potassium Iodide | 0.09 |
| Cupric Acetate monohydrate | 0.009 |
| Acetic Acid | 0.06 |
| Hexamethylene diammonium phenylphosphonate | 0.27 |
| Total Water (approx.) | 64 |

The autoclave and contents are heated to approximately 210° C and 250 pounds per square inch pressure. At this stage bleeding of water vapor is begun and forced agitation of the contents started.

Following a pressure hold cycle, the temperature of the autoclave is raised to approximately 290° C while the pressure is reduced to atmospheric. The acetic acid is used as an amine end terminator to control polymer chain length. Upon completion of the polymerization reaction the polymer has a relative viscosity of 38. The polymer is extruded in the form of a ribbon upon a casting wheel. After quenching, it is cut into chips suitable for remelting at the grid of a spinning assembly. The poly(hexamethylene adipamide) flake is first melted in a steam atmosphere as taught in Waltz, U.S. Pat. No. 2,571,975 and then spun as yarn (A) at a rate of 410 yards per minute and drawn about 5X into 840 denier 140 filament yarn.

Exclusion of hexamethylene diammonium phenylphosphonate from the polymer composition produces yarn (B). Exclusion of cupric acetate monohydrate and potassium iodide and hexamethylene diammonium phenylphosphonate from the polymer composition produces yarn (C). Yarn (D) contains only the hexamethylene diammonium phenylphosphonate.

The drawn yarns (A), (B), (C), and (D) are washed in carbon tetrachloride for five minutes, to remove finish, and then are air dried. These yarns were compared for dye absorption by suspending for 1 minute a 5 gram yarn skein in an agitated boiling solution (pH 6.5) containing 0.01 weight percent of C.I. acid red 57.

TABLE II

| Item | Amine Ends* (egs./$10^6$ g.) | Percent Dye Absorbed |
|---|---|---|
| A | 49.0 | 55 |
| B | 43.3 | 36 |
| C | 53.4 | 36 |
| D | 49 | 53 |

*Calculated according to "Analytical Chemistry", Vol. 19, p. 448, July 1947, "Determination of the Molecular Weight of Nylon" by Waltz et al.

Data presented in Table II show that the inclusion of hexamethylene diammonium phenylphosphonate in 66 polymer increases the dye absorbability, as measured in this test, 1.5 times the dye absorbability of 66 polymer. This table further shows that the inclusion of copper acetate and potassiium iodide at the specified levels has no effect on dye absorbability.

EXAMPLE II

Yarns prepared in Example I were tested in the Atlas Model X.W. Weather-o-meter according to the specifications described by the Society of Automotive Engineers (S.A.E. - J4C par 4.5 and 7.5). Results, shown in Table III, show that yarns A, and B resist degradation, due to heat and light, far better than required by S.A.E. J4C (minimum of 60% strength retention).

TABLE III

| Items | % Strength Retention |
|---|---|
| A | 76 |
| B | 85 |
| C | 40 |

EXAMPLE III

This example illustrates the process of the invention and the improved processing achieved with hexamethylene diammonium phenylphosphonate.

Polymerization is carried out as taught in U.S. Pat. No. 2,361,717 to produce polymer from a continuous polymerizing system. Molten polymer is fed to a spinning unit and yarn samples from the polymer composition are spun. Yarn equivalent to a yarn A in Example I was spun and caused a spinning pack pressure increase of only 11 lbs./hour. This sample lost only 21% of the copper added (as copper acetate to the system) throughout the polymerizing and spinning system by conversion to insoluble copper compound or metallic copper. Substitution of 0.5%, based on polymer weight, hexamethylene diammonium phenylphosphinate for hexamethylene diammonium phenylphosphonate in the polymer composition resulted in a spinning pack pressure increase of 35 lbs./hr. when the polymer was spun into yarn. Up to 70% of the copper added was lost throughout the polymerizing and spinning system. High copper loss as results when copper ions are reduced to metallic copper particles, is detrimental to the production of acceptable yarn. It causes plugging of the spinning pack and materially reduces spinning pack life. It also contaminates the polymerizing vessels and reduces their production life. The combination of these three effects: (1) production of quality product, (2) improvement in spinning pack life, and (3) improvement in polymerizing vessel life, are important attributes of the present invention.

This invention broadly applies to linear polyamides whose carbonamide linkages are an integral part of the main polymer chain.

Typical of such polyamides are those formed from an aliphatic diamine and a aliphatic diacid containing the repeating unit $$-X-Z-Y-Z$$

wherein X and Y represent divalent aliphatic, cycloaliphatic, or mixed aliphatic-cycloaliphatic groups, and —Z— represents the $$\begin{array}{c} O \quad H \\ \| \quad | \\ -C-N- \end{array}$$

linkage. Especially useful polyamides are those in which —X— and —Y— are $(CH_2)_{n-1}$, where n is a positive integer of from 1 to 12 inclusive. —X— and —Y— may be the same or different. Poly-hexamethylene adipamide and polycarbonamide (i.e., "66" and "6" nylon) are typical. Useful polyamides are also those in which —X— and/or —Y— is cycloaliphatic or aliphatic-cycloaliphatic, such as those derived from hexahydroterephthalic acid, bis(4-amino cyclohexyl) methane and bis(4-aminocyclohexyl)propane-2.

Other suitable polyamides are those having the repeating structure $$-A-Z-X-Z-$$

wherein —A— is a divalent aromatic radical and —X— and —Z— are as previously defined. Polyhexamethylene isophthalamide and poly(dimethylhexamethylene terephthalamide) are illustrative of such polymers.

Additional polyamides having repeating units such as $$-A-Z-B-Z-$$

and $$-X-Z-B-Z-$$

where —B— is a divalent alkaryl (such as xylylene) may be used provided that only the melt-spinnable polymers and copolymers are intended. Poly(m-xylylene adipamide) and poly(p-xylylene sebacamide) are typical.

Another class of suitable polyamides containing other than aromatic intracarbonamide repeating units are those prepared from piperazine, such as those from piperazine and adipic acid and the like, including methyl substituted derivatives of piperazine.

The stabilized polymeric compositions of this invention may also contain small amounts of such additives as antistatic agents, dyeing and coloring aids, and ultraviolet screens.

Polymers and copolymers modified according to this invention are useful for spinning continuous filaments, of round, lobed and odd cross-section, and either of substantially uniform or mixed deniers. These stabilized polymeric filaments may comprise core and sheath, side-by-side bicomponent, may be irradiation-grafted and may be of a hollow structure. These stabilized polymeric filaments may be processed into tow and staple, and also may be bulked, crimped, textured, etc.

The delustrant for the filamentary structures of this invention may be any of the conventional delustrants such as titanium dioxide, barium sulfate, aluminum trioxide, and the like. These delustrants are disclosed in U.S. Pat. No. 2,205,722.

What is claimed is:

1. In a process for the preparation of a heat-stabilized polycarbonamide filament having enhanced acid-dyeability including preparing the polymer by melt polymerization in the presence of a soluble copper compound, a metal halide and a phosphorus compound and melt-spinning a filament from the polymer, the improvement for reducing the loss of soluble copper from the molten polymer comprising adding as the phosphorus compound at least 0.01% based on the weight of the polymer of hexamethylene diammonium phenyl-phosphonate to the polymer precursors before or during polymerization.

2. The process of claim 1 wherein the copper compound is cupric acetate and the metal halide is potassium iodide.

3. The process of claim 2 wherein at least 0.05% of hexamethylene diammonium phenylphosphonate is added.

4. The process of claim 2 wherein at least 0.5% of hexamethylene diammonium phenylphosphonate is added.

5. The process of claim 2 wherein the hexamethylene diammonium phenylphosphonate is added as an aqueous solution prepared by the addition of hexamethylene diamine to an aqueous solution of phenylphosphonic acid in sufficient quantity to adjust the pH of the solution to 6.2.

6. The process of claim 5 wherein the polymerization process is performed continuously.

7. The process of claim 2 wherein the polycarbonamide is poly(hexamethylene adipamide).

8. The process of claim 7 wherein the hexamethylene diammonium phenylphosphonate is added by formation in situ by addition of phenylphosphonic acid to the precursor.

* * * * *